United States Patent Office 3,702,853
Patented Nov. 14, 1972

3,702,853
CERTAIN 5-SUBSTITUTED TETRAHYDROISOBENZOFURAN-1-ONES
John A. Edwards, Los Altos, and John H. Fried, Palo Alto, Calif., assignors to Syntex Corporation, Panama, Panama
No Drawing. Continuation-in-part of application Ser. No. 697,010, Jan. 11, 1968. This application Jan. 13, 1970, Ser. No. 2,675
Int. Cl. C07d 5/40
U.S. Cl. 260—343.3                    4 Claims

ABSTRACT OF THE DISCLOSURE

Production of substituted cyclohexene carboxylic acids and novel substituted cyclohexene carboxylic acids and derivatives thereof useful as antifertility agents.

---

This is a continuation-in-part of application Ser. No. 697,010, filed Jan. 11, 1968, now abandoned.

This invention relates to a novel process for the production of substituted cyclohexene carboxylic acids and novel substituted cyclohexene carboxylic acids and derivatives thereof. More particularly, the present invention relates to a process for the production of cyclohexene carboxylic acids and derivatives thereof of the following formula:

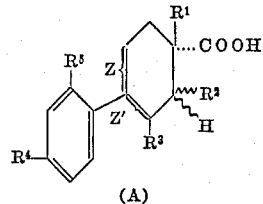

(A)

wherein,
$R^1$ is hydrogen, methyl or ethyl;
$R^2$ is methyl or ethyl;
$R^3$ is hydrogen, methyl, ethyl or isopropyl;
$R^4$ is hydrogen, lower alkoxy, hydroxy and the hydrolyzable carboxylic esters thereof, cyclopentyloxy, cyclohexyloxy, tetrahydropyran-2'-yloxy, tetrahydrofuran-2'-yloxy, the group $OSO_2OX$ or the group $OPO(OX)_2$, wherein X is hydrogen or an alkali metal;
$R^5$ is hydrogen, lower alkyl, lower alkoxy, hydroxy and the hydrolyzable carboxylic esters thereof, cyclopentyloxy, cyclohexyloxy, tetrahydropyran-2'-yloxy, tetrahydrofuran-2'-yloxy, the group $OSO_2OX$ or the group $OPO(OX)_2$, wherein X is hydrogen or an alkali metal; and
Z and Z' is a carbon to carbon single bond or double bond provided that at least one of Z and Z' is a carbon to carbon single bond.

The term "lower alkyl," as used herein, refers to a straight or branched saturated aliphatic hydrocarbon group of from one to about six carbon atoms. The term "lower alkoxy," as used herein, refers to the group —OAlkyl in which alkyl is a lower alkyl group as defined herein. The wavy lines (⸻) at the 2-position indicates alpha and/or beta configuration, i.e. the cis and trans isomers.

The term "hydrolyzable carboxylic esters," as used herein, refers to those hydrolyzable carboxylic ester groups conventionally employed in the synthetic hormone art derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-$\beta,\beta$-dimethylglutarate, acetoxyacetate, 2-chloro-4-nitrobenzoate, aminoacetate, diethylaminoacetate, piperidinoacetate, $\beta$-chloropropionate, trichloroacetate, $\beta$-chlorobutyrate, and the like.

The compounds of Formula A above are produced according to the following outlined process:

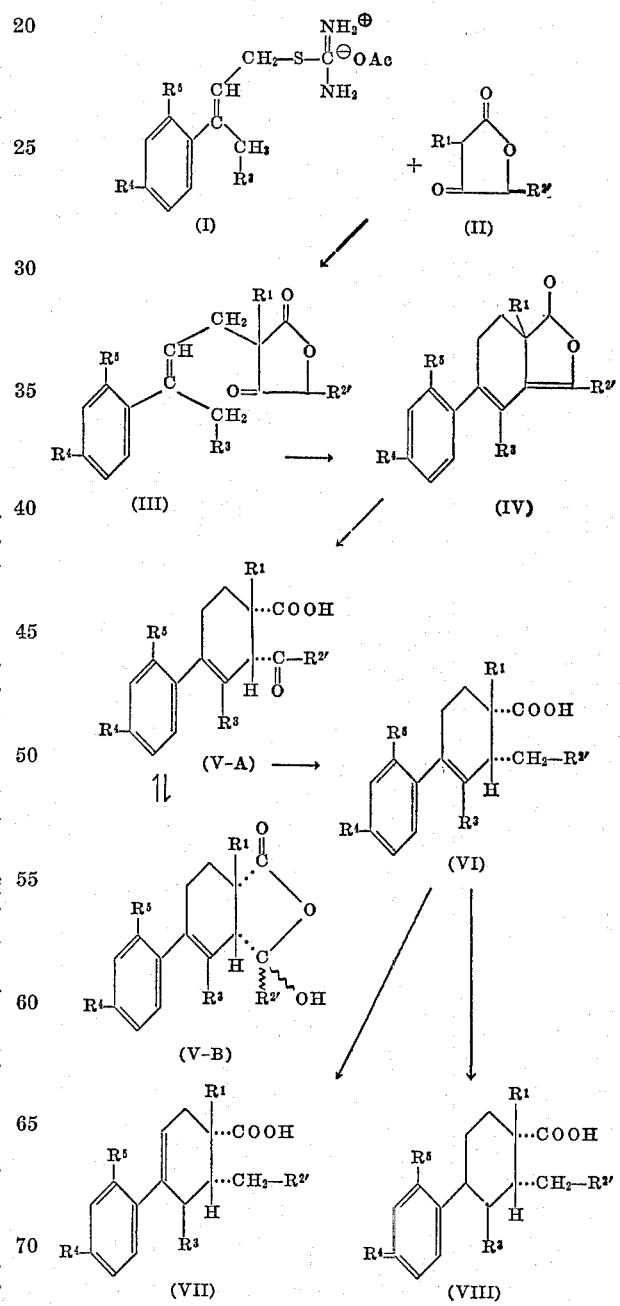

In the above formulas $R^1$, $R^3$, $R^4$ and $R^5$ have the same meaning as given hereinabove and $R^{2'}$ is hydrogen or methyl.

In the practice of the above outlined process, a compound of Formula I is reacted with a tetronic acid of Formula II in an aqueous solution of a water-miscible organic solvent such as methanol, ethanol, monoglyme, diglyme, tetrahydrofuran, and the like at about room temperature to about 75° C. for from about 1 to 40 hours to afford the α-substituted tetronic acid (III). In this reaction, temperatures above room temperature are preferred when the phenyl ring of the isothiouronium acetate (I) bears a free hydroxy group or is unsubstituted. This reaction, although not necessary, can be carried out in the presence of an alkaline catalyst, e.g. organic tertiary amines such as triethylamine or inorganic alkalines such as sodium or potassium hydroxide. The reaction is generally complete in about one to four hours. A compound of Formula III is then contacted with an acid, preferably a strong acid, either alone or in an organic solvent inert to the reaction such as benzene, xylene, methanol, dioxane, and the like at a temperature of from about room temperature to the reflux temperature of the solvent for a period of about 1 to 24 hours to form an enol lactone of Formula IV. Exemplary of the inorganic and organic acids suitable for this reaction orthophosphoric acid, sulfuric acid, formic acid, hydrochloric acid, and the like. Preferably, this ring cyclization is effected by treatment with p-toluenesulfonic acid in benzene, xylene, or toluene at reflux for about four hours. When the phenyl ring of III is unsubstituted or bears a free hydroxy group, the solvent is preferably xylene or toluene.

An enol lactone of Formula IV is then treated with an aqueous water-miscible organic solvent solution of a base such as the alkali metal hydroxides, and the like at about room temperature for a period of about one to several hours followed by acidification of the reaction mixture to afford an equilibrium mixture of a tautomeric cis keto acid of Formula V-A and cis lactol of Formula V-B. This equilibrium mixture is predominantly the cis lactol and for the sake of clarity and to avoid undue prolixity hereinafter reference to the cis lactol is understood to be inclusive of the cis keto acid, i.e. the equilibrium mixture.

A cis lactol is then subjected to carbonyl reduction to afford a cis acid of Formula VI. Alternatively, the cis lactol can be first converted into the corresponding cis keto ester (VI') by treatment with a lower alkyl halide, preferably an alkyl bromide or iodide containing up to six carbon atoms in an organic solvent such as dimethylacetamide or dimethylformamide at about room temperature for from about 1 to about 10 hours and thereafter subjecting the cis keto ester to carbonyl reduction to give the acid ester (VI'') which is converted into the free acid (VI) by alkaline hydrolysis. Although the description following is specific to carbonyl reduction of the cis lactol as outlined above, it is equally applicable or useful for carbonyl reduction of the keto ester.

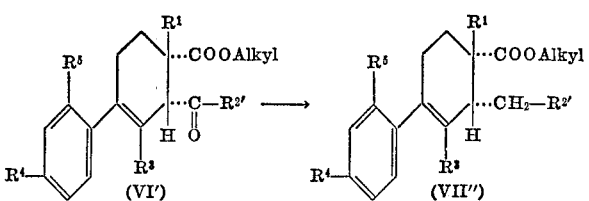

A cis lactol (V-A) and V-B) is subjected to carbonyl reduction to afford the cis acid (VI). Carbonyl reduction can be accomplished electrolytically in a divided electrolysis cell. In carrying out carbonyl reduction by the electrochemical method, reduction is effected at the cathode of a divided electrolysis cell in an electrolytic medium comprising mineral acid electrolyte, water and a water-miscible inert organic solvent at a current density of about 0.01 to about 0.2 amp./cm.$^2$ and at a temperature of from about 0° C. to about 70° C., for a period of about 1 to about 16 hours. Mineral acids suitable for the electrolytic medium are sulfuric acid, hydrochloric acid, perchloric acid, hydrobromic acid, phosphoric acid, and the like. Preferably, sulfuric acid or perchloric acid. Water-miscible organic solvents inert to the electrolysis reaction suitable for the electrolytic medium are ethers such as dioxane, tetrahydrofuran, and the like, lower monohydric alcohols such as methanol, ethanol, and the like, lower alkylene glycols such as ethylene glycol, propylene glycol, and the like, mixtures of the foregoing solvents, and the like in which the cis lactol is soluble or substantially soluble.

The amount of solvent present in the electrolytic medium can range from that amount which is sufficient to dissolve or substantially dissolve the cis lactol up to about 94%, preferably from about 20%, to about 85%, by weight, of the total electrolytic medium. The amount of acid in the medium can range from about 1% to about 20%, by weight, of the total electrolytic medium, preferably from about 2% to about 15%. The amount of water in the medium should be at least 5%, by weight, of the total electrolytic medium, preferably from about 10% to about 75%. A preferred medium is an equal volume of the inert organic solvent and an equal volume of 10% to 30% aqueous sulfuric acid, by weight.

Cathode materials useful in the process of the electrochemical reduction include the high hydrogen over-voltage materials such as lead, cadmium, mercury, and the like. The cathode may be in any number of physical forms but preferably in a form having a high surface such as a sheet or a wire mesh which is sufficiently rigid to be used as a stirring means. Anode materials useful for this reduction are difficulty oxidizable conductors such as carbon, platinum, iron, lead, and the like. In general, the anode material may be any conductor which is not attacked by the electrolytic medium in a manner which would transform it into a soluble state over a short period.

A current density of about 0.01 to about 0.2 amp./cm.$^2$, preferably from about 0.02 to about 0.1 can be used. Depending primarily upon the current efficiency of the system, reduction times of about 1 to about 16 hours are generally employed. A temperature within the range of about 5° C. to about 40° C. is preferred.

A 2 - alkylcyclohex - 3 - ene - 1 - carboxylic acid (VI) can be reduced to afford the corresponding 3,4-dihydro compound (VIII). This reduction can be accomplished catalytically using, for example, a palladium catalyst such as palladium-on-charcoal, and the like.

A 2 - alkylcyclohex - 4 - ene - 1 - carboxylic acid (VII) can be obtained by treatment of a 2-alkylcyclohex-3-ene-1-carboxylic acid (VI) with hydrogen chloride, and the like in an organic solvent such as benzene, toluene, and the like according to the procedure of Hogg and Nathan, U.S. Pat. No. 2,582,253.

A process which is especially useful for the preparation of the trans isomers of Formula V' is to treat an enol lactone (IV) with an aqueous water-miscible organic solvent solution of an alkali metal hydroxide, e.g. sodium or potassium hydroxide, at about room temperature for a period of several hours or at higher temperatures, e.g. reflux, for a shorter period of time to afford a trans keto acid of Formula V' together with a minor amount of an equilibrium mixture of the cis isomers (V-A and V-B).

The trans keto acid can be isolated at this point by conventional procedures such as fractional crystallization.

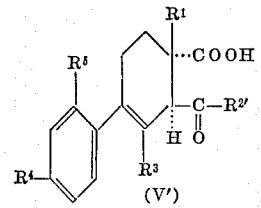

(V')

The keto acid (V') is subjected to the electro-chemical reduction procedure described above to afford the corresponding acid.

In carrying out the opening of the enol lactone (IV) by treatment with alkali hydroxide, reaction times of the order of about one to three hours furnish predominantly the cis isomer whereas reaction times extending beyond about three hours lead to formation of the trans isomer. In other words, formation of the trans isomer is increasingly promoted as the reaction time extends beyond about three hours.

In practicing the above outlined process, acid labile groups in a compound of Formula III and V, that is, when either $R^4$ and $R^5$ or both is tetrahydropyran-2'-yloxy or tetrahydrofuran-2'-yloxy, are generally hydrolyzed in the course of the reaction to free hydroxy groups. The free hydroxy group(s) is re-etherified subsequently, if desired, by treatment with dihydropyran or dihydrofuran and an acid catalyst such as p-toluenesulfonic acid either alone or in a cosolvent such as benzene. Also, base labile groups in a compound of Formula IV, that is, when either $R^4$ or $R^5$ or both is an ester group, are generally hydrolyzed in the course of the reaction to free hydroxy groups which can be re-esterified subsequently, if desired, using conventional esterification procedures.

The cyclohexenecarboxylic acids of Formulas VI and VII above and the cyclohexanecarboxylic acids of Formula VIII above and those derived from compounds of Formula V' can be converted into valuable acid derivatives of the following Formula B:

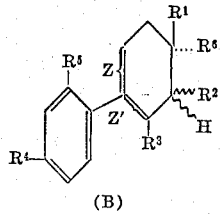

(B)

wherein $R^6$ is hydroxymethyl and the hydrolyzable carboxylic esters thereof, formyl, —COCl, —COF, —CONH$_2$, or the group

in which $R^7$ is lower alkyl or an alkali metal and $R^1$, $R^2$, $R^3$, $R^4$, $R^5$, Z and Z' are as defined hereinabove, provided that when $R^6$ is —COCl or —COF that neither of $R^4$ or $R^5$ is the group OSO$_2$OX, or the group OPO(OX)$_2$.

The acid chlorides (B; $R^6$ is

are obtained by treating the free acid (VI, VII or VIII) with triphenyl phosphine in carbon tetrachloride or by treatment with thionyl chloride or oxalyl chloride in an inert halogenated solvent such as chloroform or methylene chloride at about room temperature for from about 1 to 12 hours. Acid labile groups may be cleaved during this reaction and consequently, if a compound of Formula B wherein $R^4$ and $R^5$ or both are tetrahydropyran - 2' - yloxy or tetrahydrofuran - 2'-yloxy is desired, it is necessary to etherify the free hydroxy compound using, e.g. the etherification procedure described hereinabove.

The compounds of Formula B wherein $R^6$ is

are obtained by treating the free acid with N-(2-chloro-1,1,2-trifluoroethyl)diethylamine in an inert solvent such as ether, acetonitrile or methylene chloride at a temperature of about 0° C. to about reflux for 1 to 10 hours.

The compounds of Formula B wherein $R^6$ is

are obtained by treating the free acid with thionyl chloride in benzene at about reflux folowed by treatment with anhydrous ammonia at about room temperature.

The compounds of Formula B wherein $R^6$ is the group

in which $R^7$ is an alkali metal, can be obtained by treating the free acid with a dilute alkali metal hydroxide solution or a dilute alkali metal bicarbonate solution in a lower alcohol solvent, e.g. ethanol, at about room temperature. The alkali metal salt can then be converted into the acid ester (B; $R^6$ is

in which $R^7$ is lower alkyl) by treatment with a lower iodide or bromide in dimethylacetamide or dimethylformamide at about room temperature.

The compounds of Formula B in which $R^6$ is hydroxymethyl are prepared by treating the ester (B; $R^6$ is

in which $R^7$ is lower alkyl) with, for example, lithium aluminum t-butoxide in an inert solvent such as tetrahydrofuran. The hydroxymethyl compound can be subjected to conventional esterification procedures to obtain the corresponding hydrolyzable carboxylic esters or alternatively they can be converted into the corresponding aldehyde (B; $R^6$ is formyl) by treatment with e.g. chromium trioxide in pyridine.

The compounds of the present invention having the group OPO(OX)$_2$ can be prepared from the corresponding free hydroxy substituted compound by treatment with, e.g. β-cyanoethyl phosphate and a condensing agent followed by hydrolysis of the reaction product or a functional derivative of phosphoric acid such as dibenzylphosphate halide followed by catalytic hydrogenolysis. The phosphoric acid ester can be transformed into the corresponding alkali metal salts by treatment with base, e.g. sodium ethylate, sodium or potassium bicarbonate, and the like. By controlling the amount of base both the mono and di salts can be obtained. Suitable procedures are described in, e.g. U.S. Pats. Nos. 2,936,313, 3,248,408, 3,254,100, 3,257,385, 3,268,562, and 3,345,259 and Chem. & Ind., pp. 1174–5 (July 8, 1967).

The compounds of the present invention having the group OSO$_2$OX can be prepared from the corresponding free hydroxy compound by tretament with, e.g. sulfur trioxide-pyridine complex at low temperatures. See, for example, British Pat. No. 926,472 (1963), J. Am. Chem. Soc., 63, 1259 (1941), J. Biol. Chem., 115, 381 (1936), and Steroids, 10, No. 3, 310 (September 1967).

The cyclohexenecarboxylic acids and derivatives thereof of Formulas A and B above are excellent anti-fertility agents. They can be used and administered in the same manner as the known cyclohexenecarboxylic acids encompassed within Formulas A and B, see for example, U.S. Pats. Nos. 2,582,253 and 3,344,147. The compounds of formulas A and B above by reason of their excellent anti-fertility activity are useful in the control of pests, for example rodents such as rats, mice, nutria, and the like. For this purpose, the compounds are admixed with a suitable bait such as grain, salmon, and the like and placed in an area accessible to the rodents. The amount of anti-fertility agent incorporated into the bait is not critical so long as it does not exceed the limit above which the rodent can detect the presence of the agent. The anti-fertility agent/bait mixture is preferably made available to the pest on, for example, alternate days in an amount which, by past experience, can be expected to be entirely consumed in two days.

Edible carriers suitable as a bait include liquids, solids and mixtures thereof such as water, milk, molasses, corn oil, peanut oil, cottonseed oil, sugar, peanut butter, chicken mash, dairy mixes, corn, oats, wheat, bran, meat, fish, lard, chopped grass or hay, cheese, salt, and the like. In addition, conventional pest attractants and other additives normally employed in baits can be added. The compositions of the anti-fertility agent and bait can be prepared, for example, as a granular mix, as a paste, as a syrup, in the form of pellets for ease of application, and the like. Other forms of carriers can also be used such as forming a solution, e.g. a salt solution or mixture containing a small amount of the anti-fertility agent, and impregnating a suitable carrier such as cellulosic materials, e.g. wood, with the solution.

The following examples are provided to illustrate the present invention.

EXAMPLE 1

To a well-stirred solution of 16.8 g. of ethyl α-propionyl propionate in 100 ml. of anhydrous ether is added dropwise 17 g. of bromine at such a rate that the solution continually remains clear. After completion of the bromine addition, stirring is maintained for an additional two hours. At the end of the reaction time, the ether is evaporated under reduced pressure and the resulting oil is then dissolved in 65 ml. of xylene, and the resulting xylene mixture is refluxed for 17 hours. The xylene mixture is allowed to cool and then concentrated to a smaller volume and upon cooling deposited a precipitate of α,γ-dimethyl tetronic acid which is collected by filtration and recrystallized from benzene:hexane.

In a similar manner, by repeating the above procedure using ethyl α-propionyl butyrate as the starting material, there is obtained α-ethyl-γ-methyl tetronic acid.

EXAMPLE 2

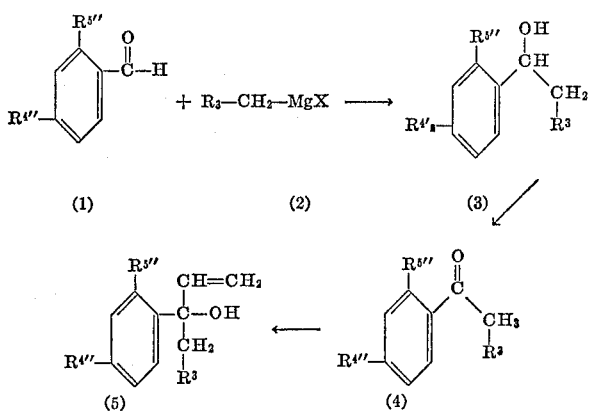

In the above outlined process for the preparation of the starting material, $R^3$ is hydrogen, methyl, ethyl or isopropyl; $R^{4''}$ is hydrogen, hydroxy or esters, lower alkoxy, cyclopentyloxy, cyclohexyloxy, tetrahydropyran-2'-yloxy or tetrahydrofuran-2'-yloxy; $R^{5''}$ is lower alkyl, hydrogen, hydroxy or esters, lower alkoxy, cyclopentyloxy, cyclohexyloxy, tetrahydropyran-2'-yloxy or tetrahydrofuran-2'-yloxy; and X is chloro or bromo.

To a freshly prepared solution of 4 g. of methylmagnesium bromide in 20 ml. of tetrahydrofuran is added a solution of 1 molar equivalent of benzaldehyde in 25 ml. of tetrahydrofuran and 15 ml. of ether. The resulting mixture is held at room temperature for 24 hours and then heated at reflux for two hours. The reaction mixture is cooled and then diluted with water. This mixture is acidified with HCl and stirred to decompose any excess Grignard reagent. The organic phase is separated and the aqueous layer extracted several times with ether. The combined ether extracts and organic phase is washed with water, dried and evaporated to furnish 2-phenyl-2-hydroxyethane (3; $R^3=R^{4''}=R^{5''}=$hydrogen). Two grams of 2-phenyl-2-hydroxyethane in 50 ml. of pyridine is added to a mixture of 1 g. of chromium trioxide in 10 ml. of pyridine. This mixture is allowed to stand at room temperature for 15 hours and is then diluted with ethyl acetate and filtered. The filtrate is washed with water, dried and evaporated to give methylphenyl ketone (4; $R^3=R^{4''}=R^{5''}=$hydrogen).

A freshly prepared solution of 3 g. of vinyl bromide in 3 ml. of tetrahydrofuran is added to 0.5 g. of magnesium in 5 ml. of tetrahydrofuran to prepare a vinyl magnesium Grignard reagent. To this mixture is then added a solution of 1 g. of methylphenyl ketone in 25 ml. of tetrahydrofuran and 10 ml. of ether and the resulting mixture is held at room temperature for a period of 24 hours, then heated at reflux for one hour and then cooled. The reaction mixture is then poured into water, acidified with hydrochloric acid and stirred vigorously to decompose any excess Grignard reagent. The organic phase is then separated and the aqueous layer is extracted several times with ether. The combined ether extracts are washed with water to neutrality, dried over sodium sulfate and evaporated to yield 2-phenyl-2-hydroxybut-3-ene (5; $R^3=R^{4''}=R^{5''}=$hydrogen).

By repeating the process of this example using substituted benzaldehydes, e.g. 4-methoxybenzaldehyde, 4,6-dimethoxybenzaldehyde, 4 - methoxy-6-methylbenzaldehyde, 6 - methoxybenzaldehyde, 4,6-dihydroxybenzaldehyde and 6-methylbenzaldehyde in place of benzaldehyde, the corresponding substituted but-3-ene compounds are obtained, that is, 2-(4'-methoxyphenyl)-2-hydroxybut-3-ene,
2-(4',6'-dimethoxyphenyl)-2-hydroxybut-3-ene,
2-(4'-methoxy-6'-methylphenyl)-2-hydroxybut-3-ene,
2-(6'-methoxyphenyl)-2-hydroxybut-3-ene,
2-(4',6'-dihydroxyphenyl)-2-hydroxybut-3-ene and
2-(6'-methylphenyl)-2-hydroxybut-3-ene, respectively.

By repeating the above procedure using ethylmagnesium bromide, n-propylmagnesium bromide and isobutylmagnesium bromide in place of methylmagnesium bromide, there is obtained the corresponding compounds of Formula 5 above wherein $R^3$ is methyl, ethyl and i-propyl, respectively, for example, 4-(4'-methoxyphenyl)-4-hydroxyhex-5-ene.

EXAMPLE 3

A mixture of 11.8 g. of thiourea and 100 ml. of acetic acid is warmed on a steam bath until the mixture becomes homogeneous. The solution is then cooled to room temperature and to it is then added 1 molar equivalent of 2-phenyl-2-hydroxybut-3-ene. The resulting mixture is agitated until the mixture again becomes homogeneous. The acetic acid is then removed by heating (50–60° C.) under reduced pressure. The residue is poured with stirring into 70 ml. of ether. The resulting precipitate is collected and dried to yield 3-phenylbut-2-enyl isothiouronium acetate (I, $R^3=R^4=R^5=$hydrogen).

By repeating the above process using other compounds of Formula 5 prepared by the procedure of Example 2 as the starting material, for example, 2-(4'-methoxyphenyl)-2-hydroxybut-3-ene,
3-(4'-methoxyphenyl)-3-hydroxypent-4-ene,
4-(4'-methoxyphenyl)-4-hydroxyhex-5-ene,
4-(4'-methoxyphenyl)-4-hydroxy-2-methylhex-5-ene,
4-phenyl-4-hydroxy-2-methylhex-5-ene,
4-(4',6'-dimethoxyphenyl)-4-hydroxy-2-methylhex-5-ene,
3-(4',6'-dimethoxyphenyl)-3-hydroxypent-3-ene, and
4-(4'-methoxy-6'-methylphenyl)-4-hydroxyhex-5-ene, the corresponding isothiouronium acetates are obtained.

EXAMPLE 4

To a solution of 12.5 g. of 3-phenylbut-2-enyl isothiouronium acetate in a mixture of 80 ml. of ethanol and 100 ml. of water, there is added a solution of 1 molar equivalent of $\alpha,\gamma$-dimethyl tetronic acid in 20 ml. of ethanol. Immediately, the reaction mixture is diluted by adding an additional 80 ml. of water, stirred and allowed to stand at room temperature for a period of 24 hours. The reaction mixture is then heated at about 60° C. for 10 hours and then cooled to 5° C. for two hours, and the thus-formed precipitate collected by filtration to yield $\alpha$-(3-phenylbut-2-enyl)-$\alpha',\gamma$-dimethyl tetronic acid (III, $R^1=R^{2'}=CH_3$, $R^3=R^4=R^5=$hydrogen).

EXAMPLE 5

To a solution of 12.5 g. of 3-(4'-methoxyphenyl)-5-methylhex-2-enyl isothiouronium acetate in a mixture of 80 ml. of ethanol and 100 ml. of water, there is added a solution of 1 molar equivalent of $\alpha,\gamma$-dimethyl tetronic acid in 20 ml. of ethanol. Immediately, the reaction mixture is diluted with 80 ml. of water and then stirred and allowed to stand at room temperature for 24 hours. The reaction mixture is then cooled to 5° C. for two hours and the thus-formed precipitate collected by filtration to yield $\alpha$ - [3 - (4' - methoxyphenyl)-5-methylhex-2-enyl]-$\alpha',\gamma$-di-methyl tetronic acid (III, $R^1=R^2=CH_3$, $R^3=$isopropyl, $R^4=OCH_3$, $R^5=$hydrogen).

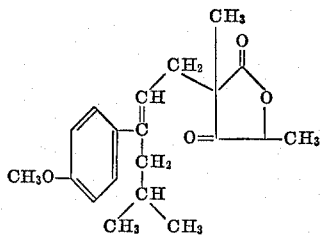

By use of the process of this example other isothiouronium acetates, e.g.

3-(4',6'-dimethoxyphenyl)-hex-2-enyl isothiouronium acetate,
3-(4'-methoxy-6'-methylphenyl)-hex-2-enyl isothiouronium acetate,
3-(4',6'-dimethoxyphenyl)-5-methylhex-2-enyl isothiouronium acetate,
3-(4'-methoxy-6'-methylphenyl)-5-methylhex-2-enyl isothiouronium acetate,
3-(4'-methoxyphenyl)-hex-2-enyl isothiouronium acetate, or
3-(4',6'-dimethoxyphenyl)-pent-2-enyl isothiouronium acetate, prepared according to the procedure of Example 3, the corresponding products are obtained, that is $\alpha$-[3-(4',6'-dimethoxyphenyl)-hex-2-enyl]-$\alpha',\gamma$-dimethyl tetronic acid,
$\alpha$[3-(4'-methoxy-6'methylphenyl)-hex-2-enyl]-$\alpha',\gamma$-dimethyl tetronic acid,
$\alpha$-[3-(4',6'-dimethoxyphenyl)-5-methylhex-2-enyl[-$\alpha',\gamma$-dimethly tetronic acid,
$\alpha$-[3-(4'-methoxy-6'-methylphenyl)-5-methylhex-2-enyl]-$\alpha',\gamma$-dimethyl tetronic acid,
$\alpha$-[3-(4'-methoxyphenyl)-hex-2-enyl]-$\alpha',\gamma$-dimethyl tetronic acid and
$\alpha$-[3-(4',6'-dimethoxyphenyl)-pent-2-enyl]-$\alpha',\gamma$-dimethyl tetronic acid, respectively.

EXAMPLE 6

Nine grams of $\alpha$-(3-phenylbut-2-enyl)-$\alpha',\gamma$-dimethyl tetronic acid and 460 mg. of p-toluenesulfonic acid in 120 ml. of toluene is heated at reflux for four hours, during which time water is continuously removed from the reaction mixture by a Dean-Stark trap. After cooling, the reaction mixture is filtered through a short column of silica gel and evaporated under reduced pressure to yield 5-phenyl - 3,8-dimethyl-6,7,8,9-tetrahydro-isobenzofuran-1-one (IV, $R^1=R^{2'}=CH_3$, $R^3=R^4=R^5=$hydrogen).

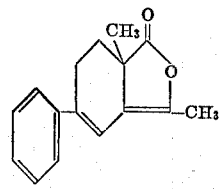

EXAMPLE 7

To a solution of 1 g. of $\alpha$-[3-(4',6'-dimethoxyphenyl)-but-2-enyl]-$\alpha',\gamma$-dimethyl tetronic acid in 20 ml. is added 1 ml. of 15% HCl (by weight). The resulting mixture is stirred and allowed to stand at room temperature for 17 hours. The reaction mixture is extracted several times with ether. The ether extracts are combined, washed well with water, dried and evaporated to give 5-(4',6'-dimethoxyphenyl) - 3,8 - dimethyl-6,7,8,9-tetrahydro-isobenzofuran - 1 - one (IV, $R^1=R^{2'}=CH_3$, $R^3=$hydrogen, $R^4=R^5=OCH_3$).

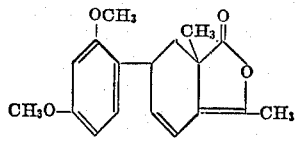

By repeating the process of this example using other substituted tetronic acids (see Example 5, for example) as the starting material, the corresponding products are obtained, that is, 5-(4'-methoxyphenyl)-4-isopropyl-3,8-dimethyl-6,7,8,9-tetrahydro-isobenzofuran-1-one,
5-(4'-6'-dimethoxyphenyl)-4-ethyl-3,8-dimethyl-6,7,8,9-tetrahydro-isobenzofuran-1-one,
5-(4'-methoxy-6'-methylphenyl)-4-ethyl-3,8-dimethyl-6,7,8,9-tetrahydro-isobenzofuran-1-one,
5-(4',6'-dimethoxyphenyl)-4-isopropyl-3,8-dimethyl-6,7,8,9-tetrahydro-isobenzofuran-1-one,
5-(4'-methoxy-6'-methylphenyl)-4-isopropyl-3,8-dimethyl-6,7,8,9-tetrahydro-isobenzofuran-1-one,
5-(4'-methoxyphenyl-3,8-dimethyl-4-ethyl-6,7,8,9-tetrahydro-isobenzofuran-1-one, and
5-(4',6'-dimethoxyphenyl)-3,4,8-trimethyl-6,7,8,9-tetrahydro-isobenzofuran-1-one, respectively.

EXAMPLE 8

A mixture of 0.5 g. of 5-phenyl-3,8-dimethyl-6,7,8,9-tetrahydro-isobenzofuran-1-one in 60 ml. of ethanol and 20 ml. of 1 N aqueous sodium hydroxide solution is allowed to stand at room temperature for two hours. This reaction mixture is then acidified by the addition of 0.1 N aqueous hydrochloric acid. The resulting acidic mixture is then extracted several times with ether. The ether extracts are combined, dried and evaporated under reduced pressure to give cis 5-phenyl-3$\xi$,8-dimethyl-3$\xi$- hydroxy - 3,9,6,7,8,9 - hexahydro - isobenzofuran - 1 - one represented as follows.

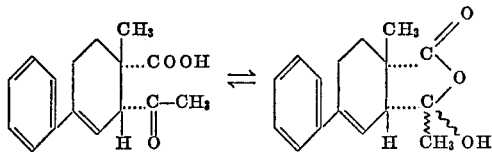

EXAMPLE 9

A mixture of 307 mg. of cis 5-phenyl-3ξ,8-dimethyl-3ξ-hydroxy - 3,9,6,7,8,9 - hexahydro-isobenzofuran-1-one, 1 ml. of methyl iodide and 7 ml. of dimethylacetamide is stirred in the dark for five hours. Then, excess methyl iodide is removed by evaporation under reduced pressure. The reaction mixture is then poured into water and the mixture extracted several times with ether. The ether extracts are combined, washed with water and then dilute aqueous sodium thiosulfate solution, dried and evaporated to furnish the methyl ester of cis 4-phenyl-1-methyl-2-acetylcyclohex-3-enecarboxylic acid which can be crystallize d from benzene-hexane (VI', $R^1=R^{2'}=OCH_3$, $R^3=R^4=R^5=$hydrogen, Alkyl=$CH_3$).

Similarly, by repeating the above procedure using other lower alkyl iodides or bromides, e.g. ethyl iodide and the like, in place of methyl iodide, the corresponding lower alkyl esters are obtained.

EXAMPLE 10

Into the cathode compartment of a divided electrolysis cell provided with a cellulose dialysis membrane, lead electrodes (each electrode measuring 2 cm. x 5 cm. x 1.6 mm.) and a stirrer, there is added 20 mg. of the methyl ester of cis 4-phenyl-1-methyl-2-acetylcyclohex-3-enecarboxylic acid and a mixture of 15 ml. of dioxane and 15 ml. of 10% aqueous sulfuric acid (by weight). An additional amount of a mixture of 15 ml. of dioxane and 15 ml. of 10% aqueous sulfuric acid is added to the cell. A current density of 0.02 amps/cm.$^2$ is applied for a period of five hours. The reaction mixture is then removed from the cell and concentrated under reduced pressure to a small volume which is then extracted several times with ether. The ether extracts are combined, washed with water and a 5% aqueous sodium bicarbonate solution, dried and evaporated to dryness to furnish the methyl ester of cis 4-phenyl-1-methyl-2-ethylcyclohex-3-enecarboxylic acid (VI'', $R^1=R^{2'}=CH_3$, $R^3=R^4=R^5=$hydrogen Alkyl=$CH_3$).

By repeating the process of this example using the cis lactol of Example 8 as the starting material, there is obtained cis 4-phenyl-1-methyl-2-ethylcyclohex-3-enecarboxylic acid (VI, $R^1=R^{2'}=CH_3$, $R^3=R^4=R^5=$hydrogen).

EXAMPLE 11

A solution of 1 g. of cis 4-phenyl-1-methyl-2-ethylcyclohex-3-enecarboxylic acid in dry benzene is chilled in an ice-bath and then saturated with dry halogen chloride. This reaction mixture is allowed to stand at room temperature for four hours. The solvent is removed by evaporation to yield cis 4-phenyl-1-methyl-2-ethylcyclohex-4-enecarboxylic acid (VII, $R^1=R^{2'}=CH_3$, $R^3=R^4=R^5=$hydrogen)

EXAMPLE 12

A suspension of 0.3 g. of 5% palladium-on-carbon catalyst in 50 ml. of methanol is hydrogenated for 30 minutes. A solution of 2 g. of cis 4-phenyl-1-methyl-2-ethylcyclohex-3-enecarboxylic acid in 150 ml. of methanol is added and hydrogenated with agitation until the uptake of hydrogen ceases. The catalyst is removed by filtration and the filtrate evaporated to yield cis 4-phenyl-1-methyl-2-ethylcyclohexanecarboxylic acid (VIII, $R^1=R^{2'}=CH_3$, $R^3=R^4=R^5=$hydrogen).

EXAMPLE 13

A mixture of 670 mg. of 5-(4',6'-dimethoxyphenyl)-3,8-dimethyl-6,7,8,9-tetrahydro-isobenzofuran-1-one in 70 ml. of dioxane and 45 ml. of 0.1 N aqueous sodium hydroxide is allowed to stand at 20° C. for 36 hours. The solvents are then removed by evaporation under reduced pressure. The resulting residue is diluted with water and acidified by adding dilute hydrochloric acid. This aqueous mixture is extracted several times with ether. The ether extracts are combined and then evaporated to dryness to yield a mixture of trans 4-(4',6'-dimethoxyphenyl)-1-methyl - 2 - acetylcyclohex-3-enecarboxylic acid and cis 5-(4',6'-dimethoxyphenyl - 3ξ,8 - dimethyl-3ξ-hydroxy-3,9,6,7,8,9-hexahydro-isobenzofuran-1-one which is separated by fractional crystallization using benzene:hexane to give trans 4-(4',6'-dimethoxyphenyl)-1-methyl-2-acetylcyclohex-3-enecarboxylic acid (X', $R^1=R^{2'}=CH_3$, $R^3=$hydrogen, $R^4=R^5=OCH_3$).

By subjecting the above prepared trans keto acid to the reduction process of Example 10, there is obtained trans-4-(4',6'-dimethoxyphenyl) - 1 - methyl - 2 - ethylcyclohex-3-enecarboxylic acid.

EXAMPLE 14

A mixture of 1 g. of 5-phenyl-3,8-dimethyl-3,4-dehydro-isobenzofuran-1-one, 0.4 g. of potassium carbonate and 100 ml. of aqueous ethanol (1:1) is refluxed for four hours. The mixture is then cooled to room temperature, concentrated to dryness under vacuum and the residue chromatographed on silica gel to yield the potassium salt of trans 4-phenyl-1-methyl-2-acetylcyclohex-3-enecarboxylic acid which is subjected to the process of Example 9 to afford the corresponding methyl ester. By use of the process of Example 10, the thus-obtained methyl ester is converted into the methyl ester of trans 4-phenyl-1-methyl-2-ethylcyclohex-3-enecarboxylic acid.

EXAMPLE 15

A mixture of 300 mg. of the methyl ester of cis 4-phenyl-1-methyl-2-ethylcyclohex-3-enecarboxylic acid, 3.1 g. of potassium hydroxide, 7 ml. of ethanol and 7 ml. of water in a sealed tube is heated at about 180° C. for about 45 minutes. The reaction mixture is allowed to cool and is then poured into water. The resulting mixture is then acidified by the addition of dilute aqueous hydrochloric acid and extracted several times with ethyl acetate. The ethyl acetate extracts are combined, dried and evaporated to give cis 4-phenyl-1-methyl-2-ethylcyclohex-3-enecarboxylic acid.

By use of the process of this example, the methyl ester of Example 14 is converted into trans 4-phenyl-1-methyl-2-ethylcyclohex-3-enecarboxylic acid.

EXAMPLE 16

A solution of 1 g. of cis 4-(4',6'-dimethoxyphenyl)-1-methyl-2-ethylcyclohex-3-enecarboxylic acid in 20 ml. of $CCl_4$ is allowed to react with 2 g. of triphenylphosphine. The reaction mixture is held at 25° C. for 12 hours. The mixture is then poured into ice water, filtered and the filtrate extracted with ether. The ether extracts are dried and evaporated to yield cis 4-(4',6'-dimethoxyphenyl)-1-methyl-2-ethylcyclohex-3-enecarboxylic acid chloride.

EXAMPLE 17

A solution of 1 g. of cis 4-(4',6'-dimethoxyphenyl)-1-methyl-2-ethylcyclohex-3-enecarboxylic acid in 30 ml. of anhydrous methylene chloride is allowed to stand with 1 g. of N-(2-chloro-1,1,2-trifluoroethyl)diethylamine. The reaction mixture is heated at reflux for five hours. The mixture is then poured into ice water, filtered and extracted with ether. The ether extracts are combined, dried and evaporated to yield cis 4-(4',6'-dimethoxyphenyl)-1-methyl-2-ethylcyclohex-3-enecarboxylic acid fluoride.

EXAMPLE 18

A mixture of 1 g. of the methyl ester of cis 4-phenyl-1-methyl-2-ethylcyclohex-3-enecarboxylic acid in 20 ml. of anhydrous tetrahydrofuran is cooled to −75° C. in a Dry Ice-acetone bath and treated with a previously cooled solution of 0.6 g. or lithium aluminum hydride in 20 ml. of anhydrous tetrahydrofuran. The reaction mixture is then allowed to warm to room temperature and is then heated at reflux for 15 minutes. The reaction mixture is then cooled and poured into ice water and extracted several times with ethyl acetate. The ethyl acetate extracts are combined, washed with water to neutrality, dried and evaporated to dryness to yield cis 4-phenyl-1-methyl-1-hydroxy-methyl-2-ethylcyclohex-3-ene which may be further purified through recrystallization from acetone:hexane.

By use of the above process the methyl ester of cis 4-(4′,6′-dimethoxy-phenyl)-1-methyl - 2 - ethylcyclohex-3-enecarboxylic acid is converted into cis 4 - (4′,6′ - dimethoxyphenyl-1-methyl-1-hydroxy-methyl - 2 - ethylcyclohex-3-ene.

EXAMPLE 19

To a solution of 1 g. of cis 4-phenyl-1-methyl-1-hydroxymethyl-2-ethylcyclohex-3-ene in 25 ml. of pyridine, previously cooled to 0° C., there is added dropwise a cooled solution (0° C.) of 1 g. of chromic trioxide in 25 ml. of pyridine. The resulting reaction mixture is held at 0° C. for a period of 24 hours, diluted with ethyl acetate and filtered through diatomaceous earth. The filtrate is washed with water, dried and evaporated to yield cis 4-phenyl-1-methyl - 1 - formyl-2-ethylcyclohex-3-ene which can be recrystallized from acetone:hexane.

By repeating the above procedure using cis 4-(4′,6′-dimethoxyphenyl)-1-methyl-1-hydroxymethyl - 2 - ethylcyclohex-3-ene as the starting material, there is obtained cis 4-(4′,6′-dimethoxy) - 1 - methyl-1-formyl-2-ethylcyclohex-3-ene.

EXAMPLE 20

A solution of 1 g. of cis 4-(4′,6′-dimethoxyphenyl)-1-thionyl chloride in 20 ml. of benzene is held at reflux for a period of two hours. The reaction mixture is cooled and evaporated. The residue is dissolved in anhydrous dioxane and the solution saturated with a stream of anhydrous ammonia. Water is then added after 24 hours and the product isolated by filtration to afford cis 4-(4′,6′-dimethoxyphenyl)-1-methyl - 2 - ethylcyclohex-3-enecarboxylic acid amide.

By repeating the above procedure using cis 4-phenyl-1-methyl - 2 - ethylcyclohex-2-enecarboxylic acid as the starting material, there is obtained cis 4-phenyl-1-methyl-2-ethylcyclohex-3-enecarboxylic acid amide.

EXAMPLE 21

A mixture of 5 g. of cis 4-(4′-methoxyphenyl)-1,2-dimethyl-3-ethylcyclohex - 4 - enecarboxylic acid, 15 g. of 48% aqueous hydrobromic acid and 30 ml. of glacial acetic acid is refluxed for two hours. The mixture is cooled, neutralized by the addition of dilute aqueous sodium bicarbonate and extracted with methylene chloride. The methylene chloride extracts are combined, washed with water, dried and evaporated to give cis 4-(4′-hydroxyphenyl)-1,2-dimethyl-3-ethylcyclohex - 4 - enecarboxylic acid.

EXAMPLE 22

A pyridine-sulfur trioxide adduct is prepared by the addition of 1 g. of liquid sulfur trioxide to 35 ml. of dry pyridine under a nitrogen atmosphere at about −10° C. to −5° C. To the adduct in pyridine is added 5 g. of 4-(4′-hydroxyphenyl)-1,2-dimethyl - 3 - ethylcyclohex-4-enecarboxylic acid in 30 ml. of pyridine with continuous cooling. The reaction mixture is stirred for about 1.5 hours at 0° C. and then for another two to three hours at room temperature. The reaction mixture is concentrated under reduced pressure. The concentrate is digested with dry ether until crystals form and then covered with dry ether and allowed to stand several hours. The reaction product is filtered and then dissolved in methanol and titrated with N sodium methylate to about pH 9. The mixture is filtered and the resulting filtrate concentrated under reduced pressure. The concentrated solution is cooled to about −40° C. to −50° C. and added to ether with stirring. The reaction product is filtered to give the disodium salt of 4-(4′-hydroxyphenyl sulfate)-1,2 - dimethyl - 3-ethylcyclohex-4-enecarboxylic acid.

The thus-obtained disodium salt of 4-(4′-hydroxyphenyl sulfate)-1,2-dimethyl-3-ethylcyclohex - 4 - enecarboxylic acid is dissolved in methanol and poured onto a column containing the free acid-form of an ion-exchange resin. The column is washed with methanol and the filtrate collected is evaporated to dryness under reduced pressure to give 4-(4′-hydroxyphenyl sulfate)-1,2-dimethyl-3-ethylcyclohex-4-enecarboxylic acid.

EXAMPLE 23

A mixture of 2 g. of cis 4-(4′-hydroxyphenyl)-1,2-dimethyl-3-ethylcyclohex-4-enecarboxylic acid and 2 molar equivalents of β-cyanoethyl phosphate in pyridine is combined with a pyridine solution of 8 molar equivalents of N,N′-dicyclohexylcarbodiimide and the reaction mixture is allowed to stand at room temperature for 24 hours. The reaction mixture is diluted with water (about 10 ml.) and allowed to stand at about 5° C. for two days. The mixture is then evaporated to dryness under reduced pressure and the residue is taken up in about 35 ml. of aqueous methanol (1:1). This mixture is treated with aboute 12 ml. of 5% aqueous sodium hydroxide solution and after about one hour at room temperature it is concentrated under reduced pressure, diluted with 30 ml. of aqueous methanol, concentrated, and mixed with 75 ml. of water. This mixture is filtered and the filtrate is treated batchwise and then columnwise with an excess of a sulfonic acid ion-exchange resin (H+ form) to give cis 4-(4′-hydroxyphenyl, 4′-dihydrogen phosphate)-1,2-dimethyl-3-ethylcyclohex-4-enecarboxylic acid.

EXAMPLE 24

By repeating the procedure of Example 8 using other enol lactones of the following formula

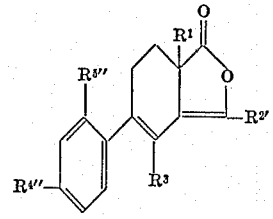

(IV′)

as the starting material, the corresponding cis lactols are obtained. In the above formula, $R^1$ is hydrogen, methyl or ethyl; $R^{2\prime}$ is hydrogen or methyl; $R^3$ is hydrogen, methyl, ethyl or isopropyl; $R^{4\prime\prime}$ is hydrogen, hydroxy and the hydrolyzable carboxylic esters thereof, lower alkoxy, cyclopentyloxy, cyclohexyloxy, tetrahydropyran-2′-yloxy or tetrahydrofuran-2′-yloxy; and $R^{5\prime\prime}$ is hydrogen, lower alkyl, hydroxy and the hydrolyzable carboxylic esters thereof, lower alkoxy, cyclopentyloxy, cyclohexyloxy, tetrahydropyran-2′-yloxy or tetrahydrofuran-2′-yloxy.

Representative of the enol lactones (IV′) are those of Example 7 which by the procedure of Example 8 are converted into the corresponding cis lactol, that is, cis 5-(4′6′-dimethoxyphenyl)-3ξ,8-dimethyl-3ξ-hydroxy-3,9,6,7,8,9-hexahydro-isobenzofuran-1-one, cis 5-(4′-methoxyphenyl)-4-isopropyl-3ξ,8-dimethyl-3ξ-hydroxy-3,9,6,7,8,9-hexahydro-isobenzofuran-1-one, cis 5-(4′,6′-dimethoxyphenyl)-4-ethyl-3ξ,8-dimethyl-3ξ-hydroxy-3,9,6,7,8,9-hexahydro-isobenzofuran-1-one, cis 5-(4'-methoxy-6'-methylphenyl)-4-ethyl-3ξ,8-dimethyl-3,9,6,7,8,9-hexahydro-isobenzofuran-1-one,
cis 5-(4',6'-dimethoxyphenyl)-4-isopropyl-3ξ-dimethyl-3ξ-hydroxy-3,9,6,7,8,9-hexahydro-isobenzofuran-1-one,
cis 5-(4'-methoxy-6'-methylphenyl)-4-isopropyl-3ξ,8-dimethyl-3ξ-hydroxy-3,9,6,7,8,9-hexahydro-isobenzofuran-1-one,
cis 5-(4'-methoxyphenyl)-3ξ,8-dimethyl-3ξ-hydroxy-4-ethyl-3,9,6,7,8,9-hexahydro-isobenzofuran-1-one and
cis 5-(4',6-dimethoxyphenyl)-3ξ,4,8-trimethyl-3ξ-hydroxy-3,9,6,7,8,9-hexahydro-isobenzofuran-1-one, respectively.

The enol lactones (IV') are obtained from the substituted tetronic acids (III') according to the procedure of Example 7.

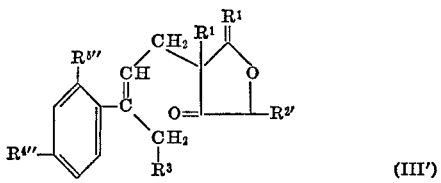

(III')

In the above Formula III', R¹, R²', R³, R⁴''', and R⁵''' are the same as defined hereinabove.

By subjecting the cis lactols of this example to the procedure of Example 10, there is obtained cis 4-(4',6'-dimethoxyphenyl)-1-methyl-2-ethylcyclohex-3-enecarboxylic acid,
cis 4-(4'-methoxyphenyl)-1-methyl-2-ethyl-3-isopropylcyclohex-3-enecarboxylic acid,
cis 4-(4',6'-dimethoxyphenyl)-1-methyl-2,3-diethylcyclohex-3-enecarboxylic acid,
cis 4-(4'-methoxy-6'-methylphenyl)-1-methyl-2,3-diethylcyclohex-3-enecarboxylic acid,
cis 4-(4-,6-dimethoxyphenyl)-1-methyl-2-ethyl-3-isopropylcyclohex-3-enecarboxylic acid,
cis 4-(4'-methoxy-6'-methylphenyl)-1-methyl-2-ethyl-3-isopropylcyclohex-3-enecarboxylic acid,
cis 4-(4'-methoxyphenyl)-1-methyl-2,3-diethylcyclohex-3-enecarboxylic acid and
cis 4-(4',6'-dimethoxyphenyl)-1,3-dimethyl-2-ethyl-cyclohex-3-ene-carboxylic acid, respectively.

EXAMPLE 25

(A) By repeating the procedure of Example 9 using the cis lactols of Example 24 as the starting material, there is obtained the methyl ester of cis 4-(4',6'-dimethoxyphenyl)-1-methyl-2-acetylcyclohex-3-enecarboxylic acid,
methyl ester of cis 4-(4'-methoxyphenyl)-1-methyl-2-acetyl-3-isopropylcyclohex-3-enecarboxylic acid,
methyl ester of cis 4-(4',6'-dimethoxyphenyl)-1-methyl-2-acetyl-3-ethylcyclohex-3-enecarboxylic acid,
methyl ester of cis 4-(4'-methoxy-6'-methylphenyl)-1-methyl-2-acetyl-3-ethylcyclohex-3-enecarboxylic acid,
methyl ester of cis 4-(4',6'-dimethoxyphenyl)-1-methyl-2-acetyl-3-isopropylcyclohex-3-enecarboxylic acid,
methyl ester of cis 4-(4'-methoxy-6'-methylphenyl)-1-methyl-2-acetyl-3-isopropylcyclohex-3-enecarboxylic acid,
methyl ester of cis 4-(4'-methoxyphenyl)-1-methyl-2-acetyl-3-ethylcyclohex-3-enecarboxylic acid and
methyl ester of cis 4-(4',6'-dimethoxyphenyl)-1,3-dimethyl-2-acetylcyclohex-3-enecarboxylic acid.

(B) By subjecting the above obtained methyl esters to the procedure of Example 10, there is obtained the methyl ester of cis 4-(4',6'-dimethoxyphenyl)-1-methyl-2-ethylcyclohex-3-enecarboxylic acid,
methyl ester of cis 4-(4',6'-dimethoxyphenyl)-1-methyl-2-ethyl-3-isopropylcyclohex-3-enecarboxylic acid,
methyl ester of cis 4-(4',6'-dimethoxyphenyl)-1-methyl-2,3-diethylcyclohex-3-enecarboxylic acid,
methyl ester of cis 4-(4'-methoxy-6'-methylphenyl)-1-methyl-2,3-diethylcyclohex-3-enecarboxylic acid,
methyl ester of cis 4-(4',6'-dimethoxyphenyl)-1-methyl-2-ethyl-3-isopropylcyclohex-3-enecarboxylic acid,
methyl ester of cis 4-(4'-methoxy-6'-methylphenyl)-1-methyl-2-ethyl-3-isopropylcyclohex-3-enecarboxylic acid,
methyl ester of cis 4-(4'-methoxyphenyl)-1-methyl-2,3-diethylcyclohex-3-enecarboxylic acid and
methyl ester of cis 4-(4',6'-dimethoxyphenyl)-1,3-dimethyl-2-ethylcyclohex-3-enecarboxylic acid.

By repeating the procedure of Example 15, the above methyl esters are converted into the corresponding free acids.

EXAMPLE 26

A solution of 1 g. of cis 4-(4',6'-dimethoxyphenyl)-1-methyl-2-ethylcyclohex-3-enecarboxylic acid in dry benzene is chilled in an ice-bath and then saturated with dry hydrogen chloride. This mixture is allowed to stand at room temperature for about four hours. Then the solvent is removed by evaporation to give cis 4-(4',6'-dimethoxyphenyl)-1-methyl-2-ethylcyclohex-4-enecarboxylic acid.

By use of the above procedure, the other cyclohex-3-ene compounds of the present invention, e.g. the cyclohex-3-enecarboxylic acids of Example 24, can be converted into cyclohex-4-ene compounds, e.g.

cis 4-(4-methoxyphenyl)-1-methyl-2-ethyl-3-isopropylcyclohex-4-enecarboxylic acid,
cis 4-(4',6'-dimethoxyphenyl)-1-methyl-2,3-diethylcyclohex-4-enecarboxylic acid,
cis 4-(4'-methoxy-6'-methylphenyl)-1-methyl-2,3-diethylcyclohex-4-enecarboxylic acid,
cis 4-(4',6'-dimethoxyphenyl)-1-methyl-2-ethyl-3-isopropylcyclohex-4-enecarboxylic acid,
cis 4-(4'-methoxy-6'-methylphenyl)-1-methyl-2-ethyl-3-isopropylcyclohex-4-enecarboxylic acid,
cis 4-(4'-methoxyphenyl)-1-methyl-2,3-diethylcyclohex-4-enecarboxylic acid and
cis 4-(4',6'-dimethoxyphenyl)-1,3-dimethyl-2-ethylcyclohex-4-enecarboxylic acid.

The methyl esters of these C-4 unsaturated compound are prepared by repeating the above procedure of this example upon the methyl ester products of Example 25 to respectively obtain the methyl ester of cis 4-(4',6'-dimethoxyphenyl)-1-methyl-2-ethylcyclohex-4-enecarboxylic acid,
methyl ester of cis 4-(4'-methoxyphenyl)-1-methyl-2-ethyl-3-isopropylcyclohex-4-enecarboxylic acid,
methyl ester of cis 4-(4',6'-dimethoxyphenyl)-1-methyl-2,3-diethyl-cyclohex-4-enecarboxylic acid,
methyl ester of cis 4-(4'-methoxy-6'-methylphenyl)-1-methyl-2,3-diethylcyclohex-4-enecarboxylic acid,
methyl ester of cis 4-(4',6'-dimethoxyphenyl)-1-methyl-2-ethyl-3-isopropylcyclohex-4-enecarboxylic acid,
methyl ester of cis 4-(4'-methoxy-6'-methylphenyl)-1-methyl-2-ethyl-3-isopropylcyclohex-4-enecarboxylic acid,
methyl ester of cis 4-(4'-methoxy-phenyl)-1-methyl-2,3-diethylcyclohex-4-enecarboxylic acid and
methyl ester of cis 4-(4',6'-dimethoxyphenyl-1,3-dimethyl-2-ethylcyclohex-4-enecarboxylic acid.

EXAMPLE 27

By repeating the procedure of Example 12 using the cyclohex-3-enecarboxylic acids of Example 24 as the starting material, there is obtained cis 4-(4',6'-dimethoxyphenyl)-1-methyl-2-ethylcyclohexanecarboxylic acid, cis 4-(4'-methoxyphenyl)-1-methyl-2-ethyl-3-isopropyl-cyclohexanecarboxylic acid,
cis 4-(4',6'-dimethoxyphenyl)-1-methyl-2,3-diethyl-cyclohexanecarboxylic acid,
cis 4-(4'-methoxy-6'-methylphenyl)-1-methyl-2,3-diethyl-cyclohexanecarboxylic acid,
cis 4-(4',6'-dimethoxyphenyl)-1-methyl-2-ethyl-3-isopropylcyclohexanecarboxylic acid,
cis 4-(4'-methoxy-6'-methylphenyl)-1-methyl-2-ethyl-3-isopropylcyclohexanecarboxylic acid,
cis 4-(4'-methoxyphenyl)-1-methyl-2,3-diethylcyclohexanecarboxylic acid and
4-(4',6'-dimethoxyphenyl)-1,3-dimethyl-2-ethylcyclohexanecarboxylic acid, respectively.

EXAMPLE 28

By repeating the procedure of Example 13 using the other enol lactones of Example 7 as the starting material, there is obtained trans 4-(4'-methoxyphenyl)-1-methyl-2-ethyl-3-isopropylcyclohex-3-enecarboxylic acid,
trans 4-(4',6'-dimethoxyphenyl)-1-methyl-2,3-diethyl-cyclohex-3-enecarboxylic acid,
trans 4-(4'-methoxy-6'-methylphenyl)-1-methyl-2,3-diethylcyclohex-3-enecarboxylic acid,
trans 4-(4',6'-dimethoxyphenyl)-1-methyl-2-ethyl-3-isopropylcyclohex-3-enecarboxylic acid,
trans 4-(4'-methoxy-6'-methylphenyl)-1-methyl-2-ethyl-3-isopropylcyclohex-3-enecarboxylic acid,
trans 4-(4'-methoxyphenyl)-1-methyl-2,3-diethylcyclohex-3-enecarboxylic acid and
trans 4-(4',6'-dimethoxyphenyl)-1,3-dimethyl-2-ethylcyclohex-3-enecarboxylic acid, respectively.

By use of the procedures of Examples 11 and 12, the above trans cyclohex-3-enecarboxylic acids can be converted into the corresponding trans cyclohex-4-enecarboxylic acid and trans cyclohexanecarboxylic acids, respectively.

EXAMPLE 29

To a solution of 1 g. of cis 4-(4',6'-dimethoxyphenyl)-1-methyl-2,3-diethylcyclohex-3-enecarboxylic acid in 25 ml. of benzene, there is added with stirring a molar equivalent of potassium bicarbonate. This mixture is stirred until the evolution of carbon dioxide ceases and then the mixture is evaporated to afford the potassium salt of cis 4-(4',6'-dimethoxyphenyl)-1-methyl-2,3-diethylcyclohex-3-enecarboxylic acid.

By use of the above procedure, the other acids of the present invention are converted into the potassium salt.

Similarly, by using sodium bicarbonate in the above procedure in place of potassium bicarbonate, the sodium salts are obtained.

Alternatively, acid salts can be prepared by titrating a solution of the free acid with an alcohol solution of an alkali metal alkoxide, e.g. potassium or sodium methoxide, to neutrality.

EXAMPLE 30

(A) To a freshly prepared solution of 4 g. of n-propyl-magnesium bromide in 30 ml. of tetrahydrofuran is added a solution of 1 molar equivalent of 4-methoxybenzaldehyde in 25 ml. of tetrahydrofuran and 15 ml. of ether. The resulting mixture is held at room temperature for 24 hours and then heated at reflux for two hours. The reaction mixture is cooled, diluted with water and acidified with hydrochloric acid and stirred to decompose any excess Grignard reagent. The organic phase is washed with water, dried and evaporated to furnish 4-(4'-methoxyphenyl)-4-hydroxybutane (3; $R^3$=ethyl, $R^{4''}$=OCH$_3$, $R^{5''}$=hydrogen). Two grams of 4-(4'-methoxyphenyl)-4-hydroxybutane in 50 ml. of pyridine is added to a mixture of 1 g. of chromium trioxide in 10 ml. of pyridine. This mixture is allowed to stand at room temperature for about 15 hours and then is diluted with ethyl acetate and filtered. The filtrate is washed with water, dried and evaporated to give n-propyl 4-methoxyphenyl ketone (4; $R^3$=ethyl, $R^{4''}$=OCH$_3$, $R^{5''}$=hydrogen). This compound is subjected to the procedure of Example 21 to afford n-propyl 4-hydroxyphenyl ketone (4; $R^3$=ethyl, $R^{4''}$=OH, $R^{5''}$=hydrogen).

By repeating the above procedure using 4,6-dimethoxybenzaldehyde and 4-methoxy-6-methylbenzaldehyde as the starting material in place of 4-methoxybenzaldehyde, there is obtained n-propyl 4,6-dihydroxyphenyl ketone (4; $R^3$=ethyl, $R^{4''}$=OH, $R^{5''}$=hydroxy) and n-propyl 4-hydroxy-6-methylphenyl ketone (4; $R^3$=ethyl, $R^{4''}$=hydroxy, $R^{5''}$=CH$_3$), respectively.

(B) A mixture of 1 g. of n-propyl 4-hydroxyphenyl ketone, 3 ml. of pyridine and 1.5 ml. of acetic anhydride is allowed to stand at room temperature for 15 hours. The mixture is then poured into ice water and the solid which forms is collected by filtration, washed with water and dried to yield n-propyl 4-acetoxyphenyl ketone which can be further purified by recrystallization.

By using other carboxylic anhydrides in place of acetic anhydride, for example, propionic anhydride, n-butyric anhydride, n-caproic anhydride, trimethylacetic anhydride, and the like, the corresponding ester is obtained.

By repeating the above procedure using n-propyl 4,6-dihydroxyphenyl ketone and n-propyl 4-hydroxy-6-methylphenyl ketone as the starting material, there is obtained n-propyl 4,6-diacetoxyphenyl ketone and n-propyl 4-acetoxy-6-methylphenyl ketone.

(C) A freshly prepared solution of 3 g. of vinyl bromide in 3 ml. of tetrahydrofuran is added to 0.5 g. of magnesium in 5 ml. of tetrahydrofuran to prepare a vinyl magnesium Grignard reagent. To this mixture is then added a solution of 1 g. of n-propyl 4-acetoxyphenyl ketone in 25 ml. of tetrahydrofuran and 10 ml. of ether. The resulting mixture is held at room temperature for a period of 24 hours, then heated at reflux for one hour and then cooled. The reaction mixture is then poured into water, acidified with hydrochloric acid and stirred to decompose any excess Grignard reagent. The organic phase is then separated and the aqueous layer is extracted several times with ether. The combined ether phases are washed with water to neutrality, dried over sodium sulfate and evaporated to yield 4-(4'-acetoxyphenyl)-4-hydroxyhex-5-ene (5; $R^3$=ethyl, $R^{4''}$=acetoxy, $R^{5''}$=hydrogen).

By repeating the above procedure using n-propyl 4,6-diacetoxyphenyl ketone and 4-acetoxy-6-methylphenyl ketone as the starting material, there is obtained 4-(4',6'-diacetoxyphenyl) - 4 - hydroxyhex - 5 - ene and 4-(4'-acetoxy - 6' - methylphenyl) - 4 - hydroxyhex-5-ene, respectively.

EXAMPLE 31

A solution of one chemical equivalent of n-propyl 4-hydroxyphenyl ketone in 25 ml. of benzene is heated to reflux and about 2 ml. removed by distillation to eliminate moisture. The mixture is cooled to room temperature and two chemical equivalents of sodium hydride are added, followed by dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield n-propyl 4-cyclopentyloxyphenyl ketone (4; $R^3$=ethyl, $R^{4''}$=cyclopentyloxy, $R^{5''}$=hydrogen).

By repeating the above procedure using an equivalent amount of cyclohexyl bromide in place of cyclopentyl bromide, there is obtained n-propyl 4-cyclohexyloxyphenyl ketone.

Similarly, using the other hydroxy compounds of Example 30(A) in the above procedure, there is obtained n-propyl 4,6-dicyclopentyloxyphenyl ketone and n-propyl 4-cyclopentyloxy-6-phenyl ketone, respectively.

By subjecting the above cyclopentyl and cyclohexyl ethers to the procedure of Example 30(C), there is obtained 4-(4'-cyclopentyloxyphenyl)-4-hydroxyhex-5-ene,
4-(4'-cyclohexyloxyphenyl)-4-hydroxyhex-5-ene,
4-(4',6'-dicyclopentyloxyphenyl)-4-hydroxyhex-5-ene,
4-(4',6'-dicyclohexyloxyphenyl)-4-hydroxyhex-5-ene,
4-(4'-cyclopentyloxy-6'-methylphenyl)-4-hydroxyhex-5-ene and
4-(4'-cyclohexyloxy-6'-methylphenyl)-4-hydroxyhex-5-ene, respectively.

EXAMPLE 32

1.5 ml. of dihydropyran is added to a solution of 1 g. of n-propyl 4-hydroxyphenyl ketone in 10 ml. of benzene. About 1 ml. is removed by distillation to eliminate moisture and 0.3 g. of p-toluenesulfonic acid is added to the cooled solution. This mixture is allowed to stand at room temperature for four days and is then washed with aqueous sodium carbonate solution and water, dried and evaporated. The residue is chromatographed on neutral alumina to yield n-propyl 4-(tetrahydropyran-2'-yloxy)-phenyl ketone (4; $R^3$=ethyl, $R^{4''}$=tetrahydropyran-2'-yloxy, $R^{5''}$=hydrogen).

A freshly prepared solution of 3 g. of vinyl bromide in 3 ml. of tetrahydrofuran is added to 0.5 g. of magnesium in 5 ml. of tetrahydrofuran to prepare a vinyl magnesium Grignard reagent. To this mixture is then added a solution of 1 g. of n-propyl 4-(tetrahydropyran-2'-yloxy)-phenyl ketone in 25 ml. of tetrahydrofuran and 10 ml. of ether and the resulting mixture is held at room temperature for a period of 24 hours, then heated at reflux for one hour and then cooled. The reaction mixture is then poured into water and hydrochloric acid is added to decompose any excess Grignard reagent. The organic phase is then separated and the aqueous layer is extracted several times with ether. The combined ether phases are washed with water to neutrality, dried over sodium sulfate and evaporated to yield 4-[4'-(tetrahydropyran-2''-yloxy) - phenyl] - 4 - hydroxyhex - 5 - ene (5; $R^3$=ethyl, $R^{4''}$=tetrahydropyran-2'-yloxy, $R^{5''}$=hydrogen).

By using dihydrofuran in the above procedure in place of dihydropyran, the corresponding tetrahydrofuran-2'-yl ether is obtained. By use of this procedure the other hydroxy compounds of Formula 4 can be converted into the tetrahydropyranyl and tetrahydrofuranyl ethers.

EXAMPLE 33

The procedure of Example 3 is repeated using 4-(4'-acetoxyphenyl) - 4 - hydroxyhex - 5 - ene, 4-(4',6' - diacetoxyphenyl)-4-hydroxyhex-5-ene and 4-(4'-acetoxy-6'-methylphenyl)-4-hydroxyhex-5-ene as the starting material and there is obtained 3-(4'-acetoxyphenyl)-hex-2-enyl isothiouronium acetate, 3-(4',-6'-di-acetoxyphenyl)-hex-2-enyl isothiouronium acetate and 3-(4'-acetoxy-6'-methylphenyl) - hex - 2 - enyl isothiouronium acetate, respectively.

By subjecting the above obtained isothiouronium acetates to the procedure of Example 5, there is obtained α - [3 - (4' - acetoxyphenyl) - hex - 2 - enyl]-α',γ-dimethyltetronic acid, α-[3-(4',6'-diacetoxyphenyl)-hex-2-enyl]-α',γ-dimethyltetronic acid and α-[3-(4'-acetoxy-6'-methylphenyl)-hex-2-enyl]-α',γ-dimethyltetronic acid, respectively, which can be treated according to the procedure of Example 7 to yield the corresponding enol lactones, that is, 5-(4'-acetoxyphenyl)-4-ethyl-3,8-dimethyl-6,7,8,9 - tetrahydro-isobenzofuran - 1-one, 5-(4',6'-diacetoxyphenyl) - 4 - ethyl - 3,8 - dimethyl - 6,7,8,9 - tetrahydro-isobenzofuran-1-one and 5 - (4' - acetoxy-6'-methylphenyl) - 4 - ethyl - 3,8 - dimethyl-6,7,8,9-tetrahydro-iso-benzofuran-1-one, respectively.

EXAMPLE 34

Instead of preparing the isothiouronium acetate of the compounds of Formula 5 above prior to the reaction with a tetronic acid to form the compounds of Formula III, a tetronic acid can be reacted directly with a compound of Formula 5 in the presence of an alkaline catalyst in an aromatic hydrocarbon solvent at elevated temperatures. For example:

To a solution of 1 g. of 4-(4'-cyclopentyloxyphenyl)-4-hydoxyhex-5-ene in 20 ml. of toluene is added 0.5 g. of triethylamine and 0.5 g. of α,γ-dimethyltetronic acid. The resulting reaction mixture is heated at reflux in a nitrogen atmospehre for about four hours during which time the water of the reaction is removed. The reaction mixture is then partially concentrated by distillation, cooled and diluted with benzene. This mixture is washed with 5% aqueous potassium bicarbonate and water, dried over sodium sulfate and evaporated to dryness under reduced pressure to give α-[3-(4'-cyclopentyloxyphenyl)-hex-2-enyl]-α',γ-dimethyltetronic acid.

EXAMPLE 35

The procedure of Example 34 is repeated using 4-(4'-methoxyphenyl)-4-hydroxyhex-5-ene and α-methyltetronic acid and there is obtained α-[4-(4'-methoxyphenyl)-hex-2-enyl]-α'-methyltetronic acid which is subjected to the procedures of Examples 7, 8, 10 and 11 to give 5-(4'-methoxyphenyl)-4-ethyl-8-methyl-6,7,8,9-tetrahydro-isobenzofuran-1-one,
cis 5-(4'-methoxyphenyl)-8-methyl-3-hydroxy-3,9,6,7,8,9-hexahydro-isobenzofuran-1-one,
cis 4-(4'-methoxyphenyl)-3-ethyl-1,2-dimethylcyclohex-3-enecarboxylic acid and
cis 4-(4'-methoxyphenyl)-3-ethyl-1,2-dimethylcyclohex-4-enecarboxylic acid, respectively.

Similarly, by subjecting 5-(4'-methoxyphenyl)-4-ethyl-8-methyl - 6,7,8,9 - tetrahydro-isobenzofuran-1-one to the procedure of Example 13, there is obtained trans 4-(4'-methoxyphenyl) - 3 - ethyl - 1,2 - dimethylcyclohex-3-enecarboxylic acid.

EXAMPLE 36

By subjecting free hydroxy-containing compounds of the Formula IX

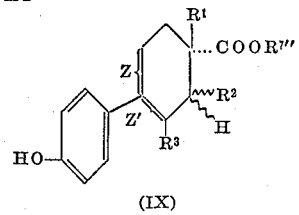

(IX)

to the procedures of Examples 22 and 23, there is obtained compounds of the Formula X

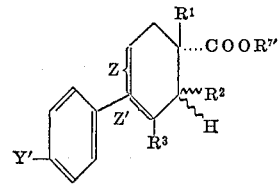

(X)

in which $R^1$, $R^2$, $R^3$, Z and Z' are as defined hereinabove; $R^{7'}$ is hydrogen, lower alkyl or an alkali metal; $R^{7'''}$ is hydrogen or lower alkyl and Y' is the group $OSO_2OX$ or the group $OPO(OX)_2$ in which X is hydrogen or an alkali metal.

The free hydroxy compounds of Formula IX can also be converted into valuable carboxylic esters using the procedure of Example 30(B) and ethers using the procedures of Examples 31 and 32.

The compounds of Formula IX are from the 4'-methoxyphenyl compounds using the procedure of Example 21 or alternatively they can be prepared from a compound of Formula I or III wherein $R^4$ is hydroxy according to the procedures hereinabove.

In accordance with the methods of the foregoing procedures, the following are prepared:

cis 4-phenyl-2-methylcyclohex-3-ene-1-methylol,
trans 4-(4'-methoxy-6'-methylphenyl)-1,3-dimethyl-1-acetoxymethyl-2-ethylcyclohex-4-ene,
cis 4-(4'-ethoxy-6'-acetoxyphenyl)-1,3-diethyl-2-methylcyclohex-3-en-1-al,
trans 4-(4',6'-bistetrahydropyran-2'-yloxyphenyl)-2-ethyl-3-isopropyl-cyclohex-4-enecarbonyl chloride,
cis 4-(4',6'-bistetrahydrofuran-2'-yloxyphenyl)-1,2-dimethylcyclohex-3-enecarboxamide,
trans 4-(4',6'-diacetoxyphenyl)-1,2-diethyl-3-methyl-cyclohex-4-enecarboxylic acid,
methyl cis 4-(6'-methoxyphenyl)-1-methyl-2,3-diethyl-cyclohex-3-enecarboxylate,
cis 4-(4'-methoxyphenyl)-1-methyl-2-ethyl-3-isopropyl-cyclohex-4-enecarboxylic acid, and
ethyl cis 4-(4'-methoxyphenyl)-1-methyl-2,3-diethyl-cyclohex-3-enecarboxylate.

What is claimed is:
1. An enol lactone selected from those of the following formula:

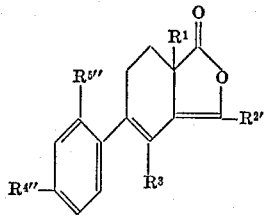

wherein,
$R^1$ is hydrogen, methyl or ethyl;
$R^{2'}$ is hydrogen or methyl;
$R^3$ is hydrogen, methyl, ethyl or isopropyl;
$R^{4''}$ is hydrogen, hydroxy and the hydrocarbon hydrolyzable carboxylic esters of 1 to 12 carbon atoms thereof, lower alkoxy of 1 to 6 carbon atoms, cyclopentyloxy, cyclohexyloxy, tetrahydropyran-2'-yloxy or tetrahydrofuran-2'-yloxy; and
$R^{5''}$ is lower alkyl of 1 to 6 carbon atoms, hydrogen, hydroxy and the hydrocarbon hydrolyzable carboxylic esters of 1 to 12 carbon atoms thereof, lower alkoxy of 1 to 6 carbon atoms, cyclopentyloxy, cyclohexyloxy, tetrahydropyran-2'-yloxy or tetrahydrofuran-2'-yloxy.

2. An enol lactone according to claim 1 wherein $R^1$ is hydrogen or methyl, $R^3$ is ethyl and each of $R^{4''}$ and $R^{5''}$ is methoxy.

3. An enol lactone according to claim 1 wherein $R^1$ is hydrogen or methyl, $R^3$ is ethyl, $R^{4''}$ is methoxy and $R^{5''}$ is methyl.

4. An enol lactone according to claim 1 wherein $R^1$ is methyl, $R^{2'}$ is methyl, $R^3$ is ethyl, $R^{4''}$ is methoxy, and $R^{5''}$ is hydrogen; 5-(4'-methoxyphenyl)-3,8-dimethyl-4-ethyl-6,7,8,9-tetrahydro-isobenzofuran-1-one.

References Cited
UNITED STATES PATENTS
3,296,276   1/1967   Sherlock _____ 260—343.3

ALEX MAZEL, Primary Examiner
A. M. T. TIGHE, Assistant Examiner

U.S. Cl. X.R.
204—74; 260—240 K, 293.73, 293.76, 293.81, 293.82, 343.6, 345.7, 345.8, 345.9, 347.2, 347.3, 347.4, 347.8, 457, 468 R, 468 B, 469, 470, 471 R, 473 R, 473 G, 476 C, 479 R, 520, 544 F, 544 M, 558 R, 558 S, 559 R, 559 T, 564 E, 613 D, 618 R, 621 R, 621 K, 624 R, 626, 964, 999